United States Patent
Andersen

(12) 
(10) Patent No.: US 8,220,327 B2
(45) Date of Patent: Jul. 17, 2012

(54) RUNOUT GAUGE

(76) Inventor: James H. Andersen, Fort Collins, CO (US)

( * ) Notice: Subject to any disclaimer, the term of this patent is extended or adjusted under 35 U.S.C. 154(b) by 631 days.

(21) Appl. No.: 12/372,829

(22) Filed: Feb. 18, 2009

(65) Prior Publication Data

US 2009/0205420 A1 Aug. 20, 2009

Related U.S. Application Data

(60) Provisional application No. 61/029,989, filed on Feb. 20, 2008.

(51) Int. Cl.
*G01M 1/00* (2006.01)
*G01M 17/02* (2006.01)

(52) U.S. Cl. .......................................................... 73/487

(58) Field of Classification Search .................... 73/487, 73/457, 458, 459, 460, 462, 468, 146
See application file for complete search history.

(56) References Cited

U.S. PATENT DOCUMENTS

| | | | | |
|---|---|---|---|---|
| 3,412,615 | A * | 11/1968 | Nedley | 73/458 |
| 3,580,064 | A * | 5/1971 | Bar-on et al. | 73/146 |
| 3,815,425 | A * | 6/1974 | Skidmore | 73/457 |
| 4,229,977 | A * | 10/1980 | Newton | 73/487 |
| 5,103,595 | A * | 4/1992 | Dale et al. | 451/5 |
| 5,443,537 | A | 8/1995 | Haskins | |
| 5,479,821 | A * | 1/1996 | Goebel | 73/457 |
| 6,170,324 | B1 | 1/2001 | Reese et al. | |
| 6,393,911 | B2 | 5/2002 | Colarelli, III et al. | |
| 6,595,053 | B2 * | 7/2003 | Parker | 73/462 |
| 6,907,781 | B2 * | 6/2005 | Racine | 73/462 |
| 7,065,444 | B2 | 6/2006 | Braghiroli | |
| 2005/0016338 | A1 * | 1/2005 | Gerdes et al. | 82/112 |

* cited by examiner

*Primary Examiner* — Helen C. Kwok
(74) *Attorney, Agent, or Firm* — Ancel W. Lewis, Jr.

(57) ABSTRACT

A runout gauge has a mounting block, a support block that slides horizontally relative to the mounting block, a spring that pushes the support block away from the mounting block, a roller that rotates on a horizontal axle on the support block, and a dial indicator that mounts on the mounting block. The dial indicator has a plunger that contacts the support block. A vertically adjustable stand positions gauge with the roller against the tire tread and radial runout pushes the support block which pushes the plunger. A narrow roller is used to measure lateral runout.

12 Claims, 3 Drawing Sheets

RUNOUT GAUGE

This application claims the benefit under 35 U.S.C. §119(e) of the U.S. provisional patent application No. 61/029,989 filed Feb. 20, 2008, for the disclosure set forth therein.

TECHNICAL FIELD

The present invention relates to vehicle tire and wheel balance and measurement, and more particularly to a gauge for measuring the radial or lateral runout on a tire or wheel rim.

BACKGROUND ART

Radial runout, in tires and wheels on vehicles, is a measure of deviation from a perfect circle. Radial and lateral runout can create vibration in a moving vehicle. These vibrations can increase driver fatigue, increase vehicle wear and cause cargo damage. Radial runout is generally caused by an out of round tire and/or wheel, and/or an imperfectly centered wheel on a vehicle hub.

Prior known run-out gauges mount a dial indicator with the plunger against the tire tread. When the tire is rotated with these gauges, a vertical force is exerted against the plunger, so the plunger can bind and the measurement can be inaccurate.

DISCLOSURE OF THE INVENTION

A runout gauge includes a vertically adjustable stand, a mounting block mounted to the top of the stand, a support block horizontally slidably mounted to the mounting block, a roller rotatably mounted on a horizontal axle on the support block, means for biasing the support block away from the mounting block and a dial indicator mounted on the mounting block and having a plunger in contact with the support block.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
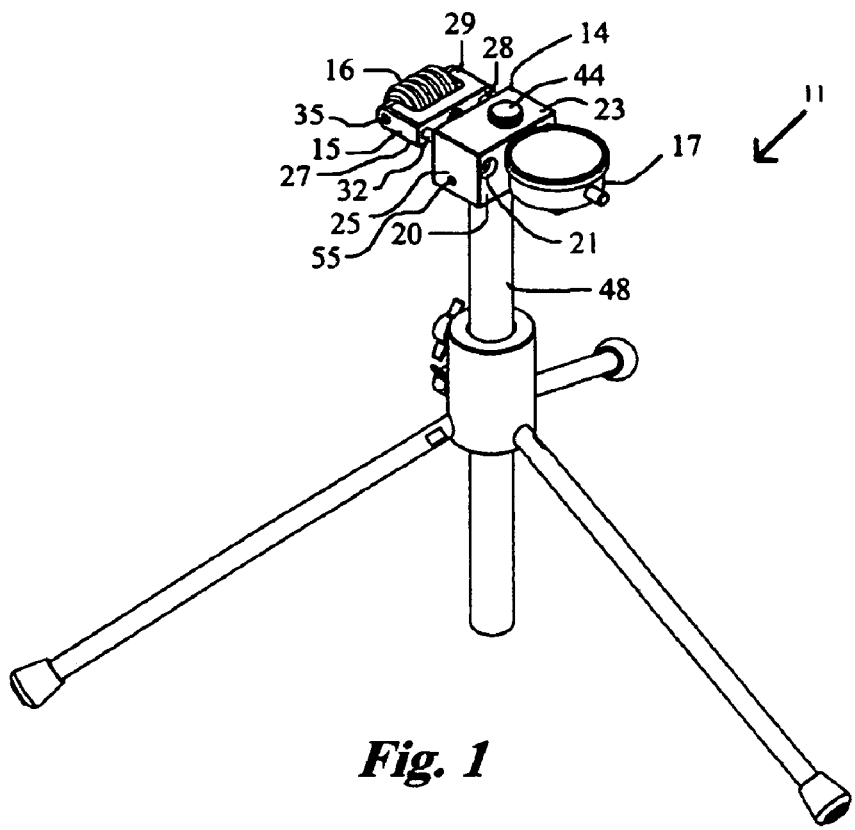
FIG. 1 is a perspective view of a runout gauge embodying features of the present invention.
Figure 2:
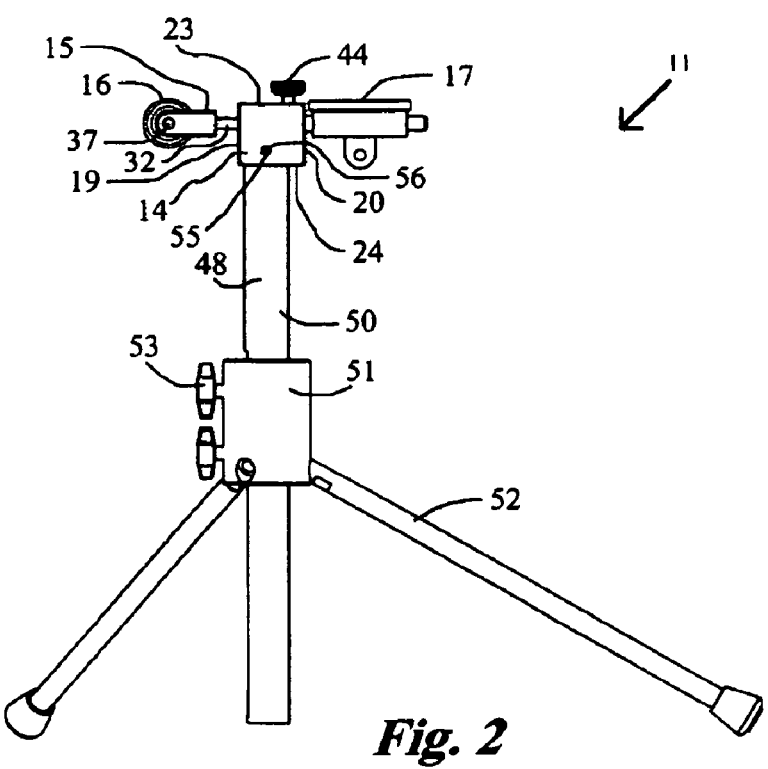
FIG. 2 is a side elevation view of the gauge of FIG. 1.
Figure 3:
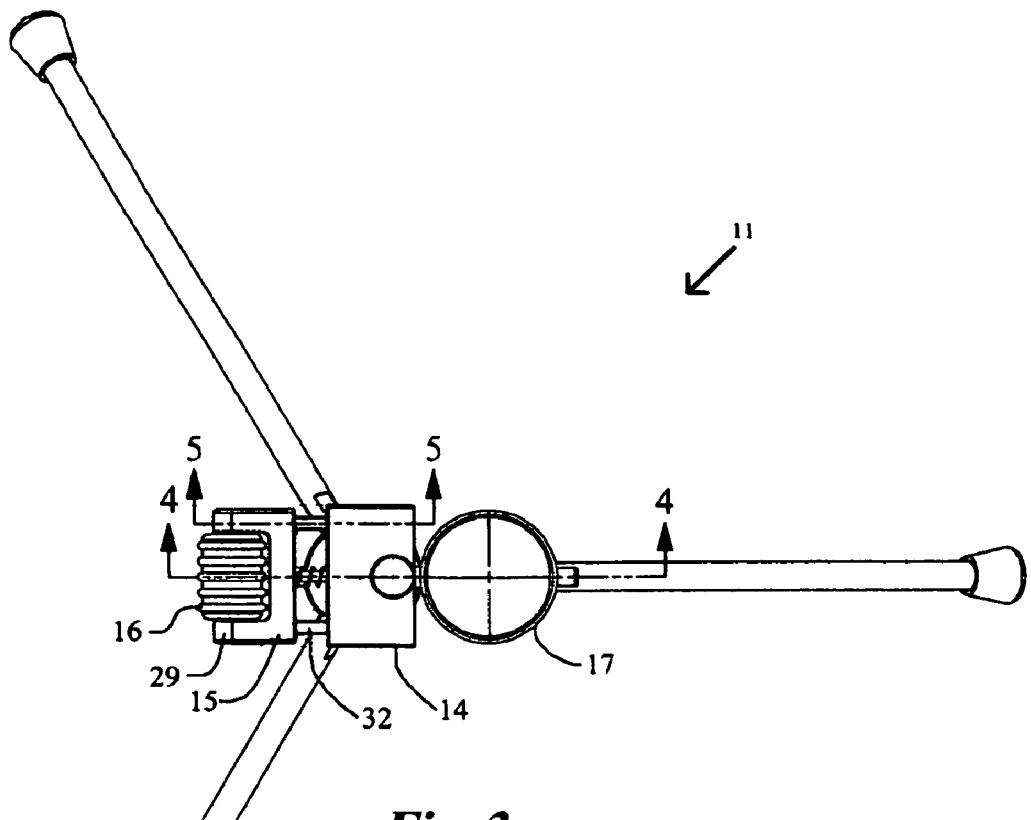
FIG. 3 is a top plan view of the gauge of FIG. 1.
Figure 4:
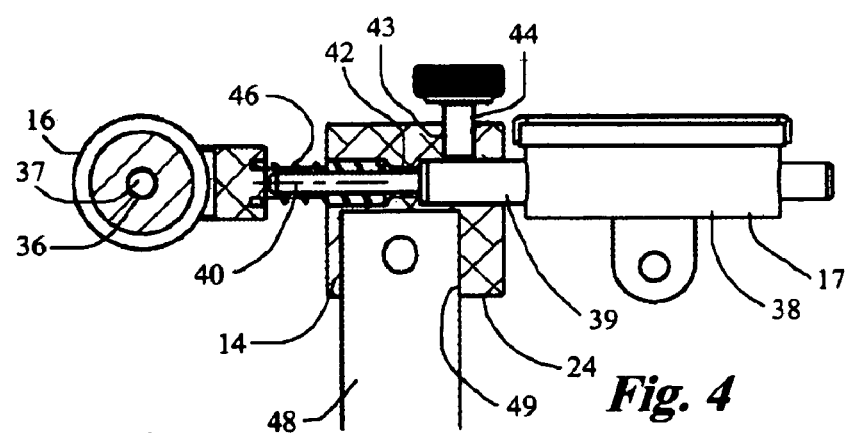
FIG. 4 is a sectional view through line 4-4 of FIG. 3.
Figure 5:
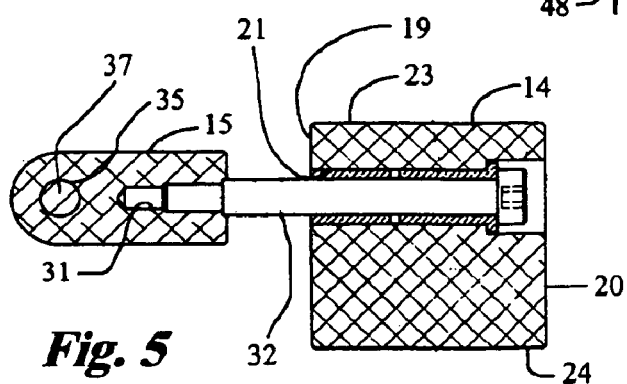
FIG. 5 is a sectional view through line 5-5 of FIG. 3.

Referring now to FIGS. 1-5, a runout gauge 11 embodying features of the present invention includes a mounting block 14, a support block 15, a roller 16, and a dial indicator 17. The mounting block 14 has a rectangular front face 19 and a spaced rectangular back face 20. A pair of spaced rod apertures 21 extend horizontally through the mounting block 14 from the front face 19 to the back face 20. The mounting block 14 has substantially rectangular, spaced top and bottom faces 23 and 24, and spaced, square side faces 25.

Describing the specific embodiments herein chosen for illustrating the invention, certain terminology is used which will be recognized as being employed for convenience and having no limiting significance. For example, the terms "front", "back", "up", and "down" will refer to the illustrated embodiment in its normal position of use. Further, all of the terminology above-defined includes derivatives of the word specifically mentioned and words of similar import.

The support block 15 has a body 27 with a back face 28, and a pair of spaced arms 29 that project forwardly from the body 27. A pair of spaced, threaded rod apertures 31, that align with the rod apertures 21 on the mounting block 14, extend into the body 27 from the back face 28. A long shanked threaded bolt 31 extends through each rod aperture 21 on the mounting block 14 and threads into one of the rod apertures 31 in the support block 15 to horizontally slidably mount the support block 15 on the mounting block 14.

Horizontally aligned arm apertures 35 extend through the arms 29, transverse to the bolts 31. The roller 16 is cylindrical, is sized to fit between the arms 29 and has a central roller aperture 36. An axle 37 through the roller aperture 36 and the arm apertures 35 rotatably mounts the roller 16 on the support block 15. The cylindrical roller 16 is preferably used to measure radial runout such as on a tire.

The dial indicator 17 has a dial portion 38, a cylindrical portion 39 extending transversely from the dial portion 38, and a plunger 40 slidable in and extending from the cylindrical portion 39. An indicator aperture 42, sized to receive the cylindrical portion 39 of the dial indicator, extends through the mounting block 14 from the front face 19 to the back face 20, between the rod apertures 21. A threaded set screw aperture 43 extends downwardly from the top face 23 into the indicator aperture 42.

The dial indicator 17 mounts on the mounting block 14 with the cylindrical portion 39 in the indicator aperture 42, the dial portion 38 behind the back face 20, and the plunger 40 extending through the mounting block 14 and contacting the support block 15. A set screw 44 in the set screw aperture 43 secures the dial indicator 17 to the mounting block 14. A compression spring 46 around the plunger, between the mounting block 14 and the back face 28 of the support block 15, biases the support block 15 away from the mounting block 14. The spring 46 is a means for biasing the support block 15 away from the mounting block 14.

The runout gauge 11 mounts on a vertically adjustable stand 48. A cylindrical stand cavity 49 extends upwardly into the mounting block 14 from the bottom face 24. The stand 48 includes a rod 50, a tube 51 and three legs 52. The rod 50 is sized to fit into the stand cavity 49. The tube 51 is sized to receive the rod 50. The legs 52 mount on the tube 51 and are circumferentially spaced at 120 degrees relative to each other. The legs 52 extend outwardly and downwardly from the tube 51. Two spaced threaded set screws 53 thread through the side of the tube 51 and press against the rod 50 to secure the rod 50 at a selected height. A threaded set screw aperture 55 extends inwardly from one of the side faces 25, and a set screw 56, in the set screw aperture 55, secures the mounting block 14 to the rod 50.

To use the runout gauge 11, the vehicle is raised and the runout gauge 11 is positioned at about the three or nine o'clock location relative to the selected tire, with the roller 16 against the center of the tire tread. The tire is rotated, radial runout pushes the support block 15, the support block 15 pushes the plunger 40, and the radial runout is recorded. The plunger 40 does not directly contact the tire and vertical force on the plunger 40 is eliminated.

Figure 6:
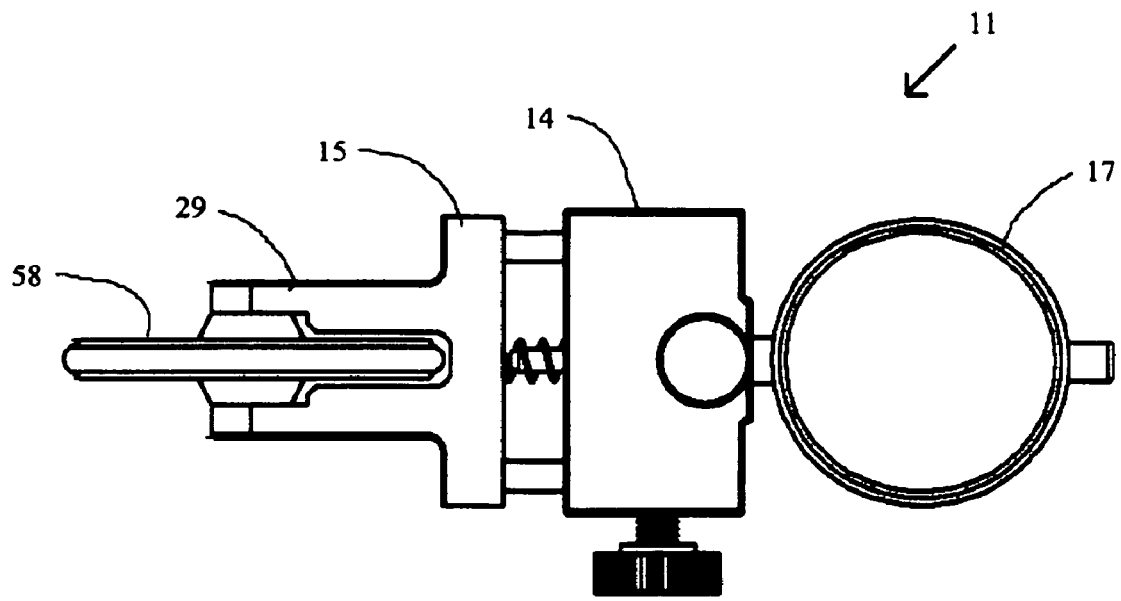
FIG. 6 is a top plan view of the gauge of FIG. 1 with a modified support block and roller.
Figure 7:
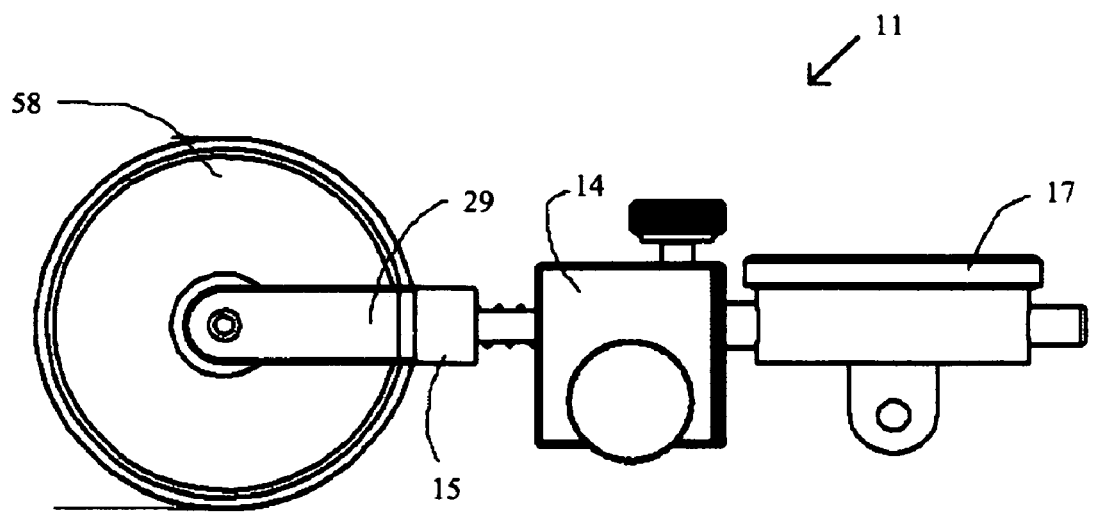
FIG. 7 is a side elevation view of the gauge of FIG. 6.

FIGS. 6 and 7 show the runout gauge 11 with a modified support block 15 and an alternative roller 58. The roller 58 shown is a narrow disk shape and the arms 29 of the support block 15 are spaced to receive the roller 58. The narrow roller 58 is preferably used to measure lateral runout such as on a tire or a wheel rim.

Although the present invention has been described with a certain degree of particularity, it is understood that the present disclosure has been made by way of example and that changes in details of structure may be made without departing from the spirit thereof.

What is claimed is:

1. A runout gauge comprising:
   a mounting block,
   a support block linearly slidably mounted on said mounting block,
   a roller rotatably mounted on said support block opposite said mounting block, and
   an indicator mounted on said mounting block and in contact with said support block to measure as a distance indicative of the linear movement of said support block relative to said mounting block,
   whereby said roller is positioned against a surface of an object to be measured, and as said object moves, runout is measured by said indicator as movement of said support block relative to said mounting block.

2. The gauge as set forth in claim 1 wherein said indicator includes a plunger that projects towards and contacts said support block, whereby movement of said support block moves said plunger to measure runout.

3. The gauge as set forth in claim 1 wherein said indicator is a dial indicator with a plunger that projects towards and contacts said support block, whereby movement of said support block moves said plunger to measure runout.

4. The gauge as set forth in claim 3 wherein said plunger extends through said mounting block.

5. The gauge as set forth in claim 1 including means for biasing said support block away from said mounting block.

6. The gauge as set forth in claim 5 wherein said means for biasing includes at least one compression spring mounted between said support block and said mounting block.

7. The gauge as set forth in claim 1 including a stand with said mounting block mounting on and being supported by said stand.

8. The gauge as set forth in claim 7 wherein said stand is vertically adjustable.

9. The gauge as set forth in claim 7 wherein said mounting block mounts on said stand such that said support block is horizontally slidable relative to said mounting block and said roller is horizontally rotatable.

10. The gauge as set forth in claim 1 wherein said roller is a generally cylindrical shape.

11. The gauge as set forth in claim 1 wherein said roller is a disk shape.

12. A runout gauge comprising:
    a mounting block,
    a support block linearly slidably mounted on said mounting block, said support block having a pair of spaced arms that project opposite said mounting block and an axle extending between said arms,
    a roller rotatably mounted on said axle,
    a compression spring between said support block and said mounting block for biasing said support block away from said mounting block,
    a dial indicator mounted on said mounting block opposite said support block, said dial indicator having a plunger that extends through said mounting block and contacts said support block to measure as a distance indicative of the linear movement of said support block relative to said mounting block, and
    a vertically adjustable stand that receives and supports said mounting clock such that said support block is horizontally slidable relative to said mounting block and said axle is horizontal,
    whereby said roller is positioned against a surface of an object to be measured, and as said object moves, runout is measured by said indicator as movement of said support block relative to said mounting block.

\* \* \* \* \*